(12) United States Patent
Yuge et al.

(10) Patent No.: US 9,285,604 B2
(45) Date of Patent: Mar. 15, 2016

(54) BLUR CORRECTION APPARATUS

(71) Applicant: Olympus Corporation, Shibuya-ku, Tokyo (JP)

(72) Inventors: Kazunori Yuge, Tokorozawa (JP); Masaya Ota, Yokohama (JP); Yoshiaki Sueoka, Hachioji (JP)

(73) Assignee: Olympus Corporation, Tokyo (JP)

( * ) Notice: Subject to any disclaimer, the term of this patent is extended or adjusted under 35 U.S.C. 154(b) by 16 days.

(21) Appl. No.: 14/294,538

(22) Filed: Jun. 3, 2014

(65) Prior Publication Data

US 2014/0354860 A1 Dec. 4, 2014

(30) Foreign Application Priority Data

Jun. 4, 2013 (JP) .................................. 2013-118172

(51) Int. Cl.
*G02B 27/64* (2006.01)
*H04N 5/232* (2006.01)

(52) U.S. Cl.
CPC .......... *G02B 27/646* (2013.01); *H04N 5/23287* (2013.01)

(58) Field of Classification Search
CPC .. G02B 27/646; G02B 27/64; H04N 5/23287; H04N 5/2328
See application file for complete search history.

(56) References Cited

U.S. PATENT DOCUMENTS

| 2006/0067672 A1* | 3/2006 | Washisu et al. ................ 396/351 |
| 2007/0206934 A1* | 9/2007 | Ishii et al. ......................... 396/55 |
| 2012/0154614 A1* | 6/2012 | Moriya et al. .............. 348/208.5 |
| 2012/0218429 A1* | 8/2012 | Suzuka ..................... 348/208.11 |
| 2012/0249814 A1* | 10/2012 | Miyoshi ..................... 348/208.7 |
| 2013/0170039 A1* | 7/2013 | Miyoshi ........................ 359/554 |

FOREIGN PATENT DOCUMENTS

JP 2008-26882 2/2008

* cited by examiner

*Primary Examiner* — Amy Hsu
(74) *Attorney, Agent, or Firm* — John C. Pokotylo; Straub & Pokotylo

(57) ABSTRACT

A blur correction apparatus includes a first fixing member, a moveable member and a second fixing member. A coil for generating a magnetic flux is arranged on the first fixing member. The movable member includes (1) a first magnet facing the coil, (2) a second magnet arranged adjacent to the first magnet, such that the first magnet is arranged between the second magnet and the coil arranged in the first fixing member, and (3) an optical element. The movable member can move in a direction perpendicular to an optical axis of the optical element relative to the first fixing member. The second fixing member includes a hall element that is arranged adjacent to the second magnet in the movable member.

20 Claims, 16 Drawing Sheets

US 9,285,604 B2

BLUR CORRECTION APPARATUS

CROSS-REFERENCE TO RELATED APPLICATION

This application claims the benefit of Japanese Application No. 2013-118172 filed in Japan on Jun. 4, 2013, the contents of which are incorporated herein by this reference.

BACKGROUND OF THE INVENTION

1. Field of the Invention

Embodiments described herein relate generally to a blur correction apparatus provided in an imaging device such as a digital camera.

2. Description of the Related Art

In recent years, digital cameras provided with a blur correction apparatus for correcting image blur caused by movement of a photographer's hand have become prevalent. Two types of blue correction techniques are known. In a first type of the blur correction apparatus, an image sensor is driven along a plane perpendicular to an optical axis to cancel blur. In a second type of the blur correction apparatus, a lens is driven along a plane perpendicular to the optical axis to cancel blur. A VCM (voice coil motor) is generally used as the driving mechanism of such blur correction apparatuses.

A VCM includes a magnet and coil. One of the magnet and coil is attached to a movable frame which holds an optical member (such as an image sensor or lens) to be driven, and the other of the magnet and coil is attached to a fixed frame which holds the movable frame such that the movable frame can move along a plane perpendicular to the optical axis. As described above, the magnet and coil may be attached to either of the movable frame or fixed frame, with one of the magnet or coil being attached to the movable frame, and the other of the magnet or coil being attached to the fixed frame.

Additionally, a hall element is attached to either of the movable frame or fixed frame so that a position of the movable frame relative to the fixed frame can be detected and a magnet for the position detection is attached to the other of the movable frame or fixed frame. The hall element and magnet for position detection may be basically attached to either of the movable frame or fixed frame. The magnet for driving the VCM may also be used for position detection.

According to Japanese Patent Application Laid-Open No. 2008-26882, a structure is disclosed where a magnet for driving is attached to a fixed frame, a coil for driving is attached to a movable frame opposite to the magnet for driving, a magnet for position detection is attached to the movable frame deviated from the coil for driving and a hall element is attached to the fixed frame opposite to the magnet for driving.

SUMMARY OF THE INVENTION

A blur correction apparatus according to an example embodiment consistent with the present invention includes a first fixing member on which a coil is disposed; a movable member including (1) a first magnet facing the coil, (2) a second magnet disposed adjacent to the first magnet, such that the first magnet is arranged between the second magnet and the coil, and (3) an optical element, wherein the movable member can move in a direction perpendicular to an optical axis of the optical element relative to the first fixing member; and a second fixing member including a hall element that is disposed adjacent to the second magnet.

BRIEF DESCRIPTION OF THE DRAWINGS

FIG. 10(a) is an illustration showing an assembly from the object side wherein the movable body of FIG. 8 is connected to a fixed barrel.

DETAILED DESCRIPTION OF THE PREFERRED EMBODIMENTS

Figure 1:
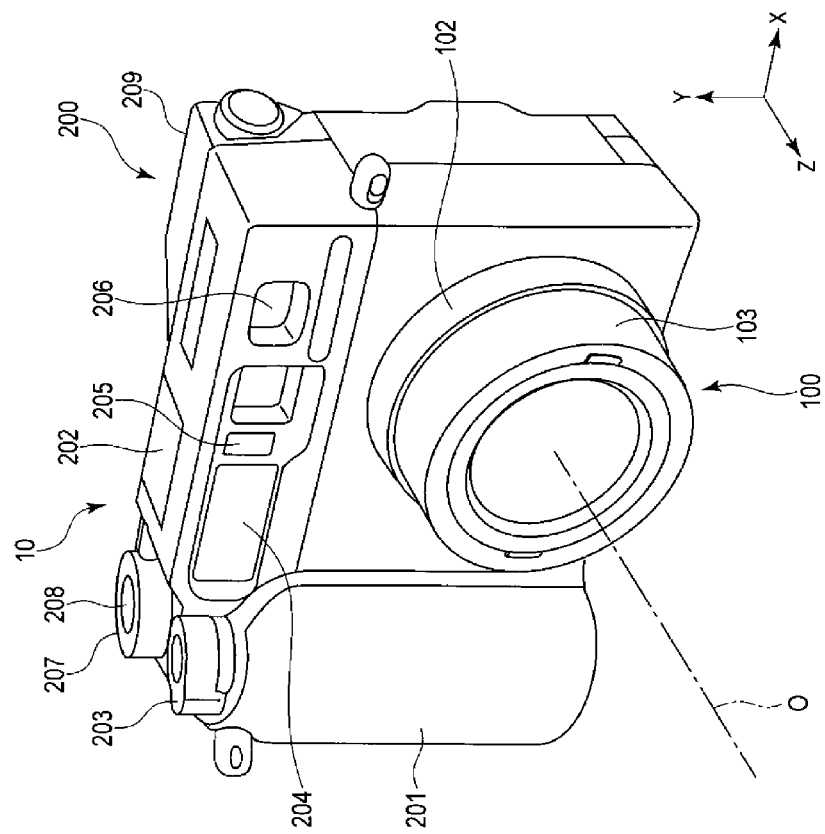
FIG. 1 is a perspective view showing a digital camera according to an embodiment of the present invention.

Example embodiments consistent with the present invention will be described in detail below with reference to the drawings. In each of the drawings for use in the following description, each of components is shown different scales according to each of the components in order to make each component recognizable in the drawings. Accordingly, the present invention is not limited only to the numbers and quantities of the components, the shapes of the components, the ratios of the sizes of the components and the relative positional relations of the respective components which are illustrated in these drawings.

In the following description, a direction from a camera body 200 to the object (not shown) is referred to as 'frontward' or 'forward' while a direction opposite thereto is referred to as 'backward' or 'rearward'. An axis which coincides with an optical axis O of an optical system formed of a lens unit 100 is defined as 'Z axis', and two axes perpendicular to each other in a plane perpendicular to the Z axis are defined as 'X axis' (an axis in the horizontal direction) and 'Y axis' (an axis in the vertical direction), respectively. The X axis, Y axis and Z axis are shown in the drawings.

Figure 2:
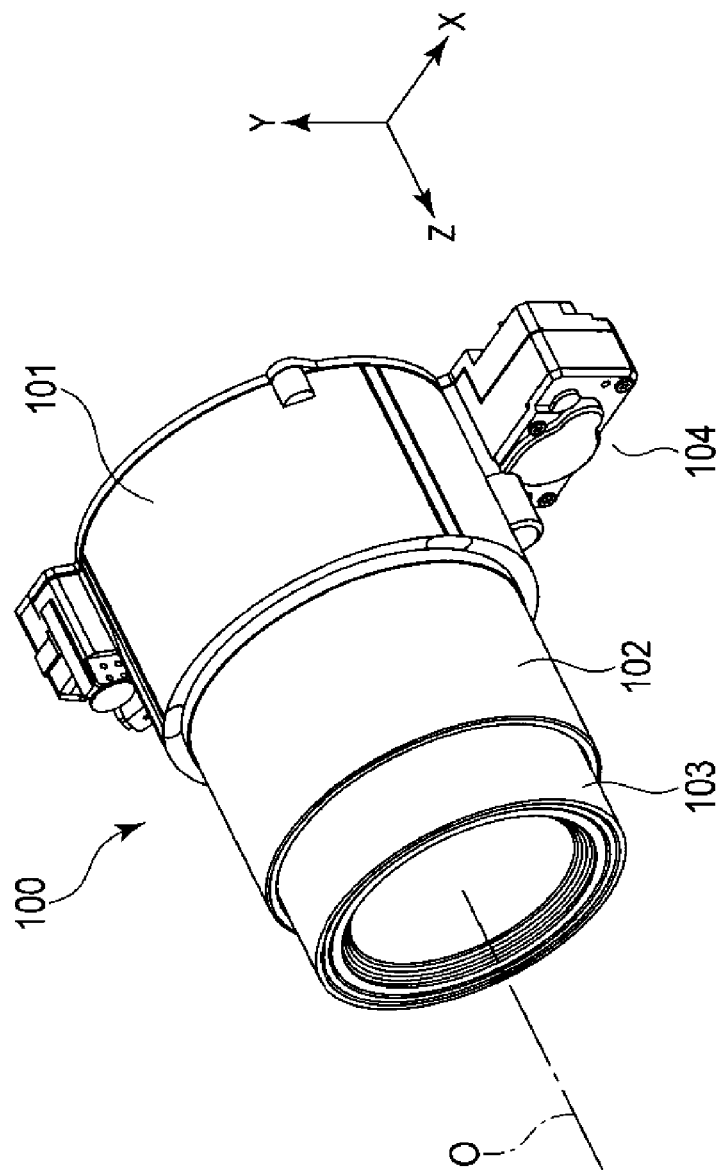
FIG. 2 is a perspective view showing a lens unit incorporated in the digital camera of FIG. 1.
Figure 3:
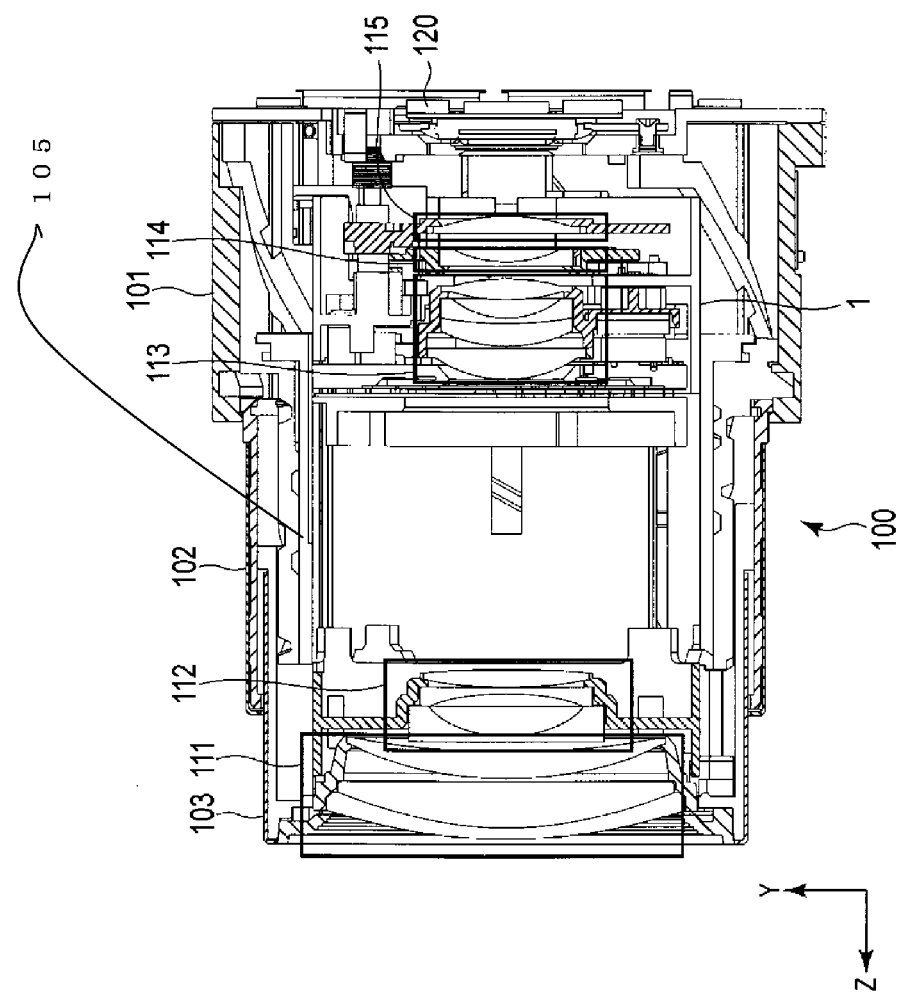
FIG. 3 is a cross-sectional view obtained by cutting the lens unit of FIG. 2 along an optical axis.

FIG. 1 is a perspective view showing a digital camera 10 according to an example embodiment consistent with the present invention. FIG. 2 is a perspective view showing the lens unit 100 incorporated in the digital camera 10 of FIG. 1. FIG. 3 is a cross-sectional view obtained by cutting the lens unit 100 of FIG. 2 along the optical axis O. As shown in the diagrams, the digital camera 10 is provided with a camera body 200 and the lens unit 100 which can be projected from and retracted into the camera body 200.

The lens unit 100 is built in the camera body 200 such that a second lens barrel 102 and a third lens barrel 103 of the lens unit 100 can be projected from a front face of the camera body 200. That is, a first lens barrel 101 of the lens unit 100 is provided within the camera body 200. When the lens unit 100 is in a retracted state, the second lens barrel 102 and the third lens barrel 103 are mostly housed within a central void defined by the first lens barrel 101, which is provided within the camera body 200. Therefore, in the retracted state, the second lens barrel 102 and the third lens barrel 103 do not project out from the front of the camera body. FIGS. 2 and 3 show an extended state of the lens unit 100.

The camera body 200 is provided with a housing 201 having a substantially rectangular box shape. The housing 201 is provided with a control panel 202, zoom lever 203, flash 204, self-timer signal 205, remote control receiving window 206, release switch 207, power switch 208 and finder 209. A rear surface (not shown) of the camera body 200 is provided with a panel for displaying an image obtained by photographing an object, photographing information, and/or images captured in a live view operation.

When a main power supply is turned on, each lens barrel (described later) moves to a photograph ready position. At the photograph ready position, a focal point is matched to a wide end or around the wide end. If a user operates the zoom lever 203 in this state, a zoom motor 104 (FIG. 2) of the lens unit 100 is driven. As a result, a fourth lens barrel 105 is rotated via a zoom gear (not shown). The fourth lens barrel 105 is engaged with a helicoid formed on the first lens barrel 101 and is projected from the first lens barrel 101 while rotating with respect to the first lens barrel 101. At the same time, the second lens barrel 102 moves in a straight line and is projected in conjunction with the projection of the fourth lens barrel 105. A cam groove (not shown), which is coupled to the third lens barrel 103 by a cam mechanism, is formed outside the fourth lens barrel 105. The third lens barrel 103 moves in a straight line by rotation of the fourth lens barrel 105 and is projected more towards the object than the second lens barrel 102. FIG. 3 shows a state in which the lens unit 100 is extended to a telephoto end. In a retracted state, the second lens barrel 102 and the third lens barrel 103 are accommodated in the first lens barrel 101.

As shown in FIG. 3, the lens unit 100 is provided with a first lens group 111, a second lens group 112, a third lens group 113, a fourth lens group 114, and a fifth lens group 115, which move along the optical axis O apart from each other. Each lens group is fixed to a lens frame and driven in units of the lens frames. The third lens group 113 is disposed in a lens frame (not shown) which moves in a straight line along the optical axis O in conjunction with rotation of the fourth lens barrel 105. The first lens group 111 and the second lens group 112 are disposed in lens frames (not numbered) which move in conjunction with rotation of the above-described fourth lens barrel 105. That is, they move in a straight line along the optical axis O in conjunction with rotation and movement in a straight line of the fourth lens barrel 105. The fourth lens group 114 and the fifth lens group 115 are movable along the optical axis O by another motor (not shown). The third lens group 113 is driven to correct blur. The fourth lens group 114 is driven based on object information to perform focusing by auto-focus.

At the time of photographing, object light (not shown) passes through the first to fifth lens groups (111 to 115) and is formed on an image sensor 120. At that time, each lens group of 111 to 115 is disposed at a prescribed position along the optical axis direction based on an amount of operation of the zoom lever 203 and the focal length of the object by auto-focus. Then the object image is formed on the image sensor 120 with a desired magnification. The image sensor 120 is fixedly provided at a rear end of the first lens barrel. An alternative embodiment consistent with the invention has a removable lens unit, and the image sensor is provided in the camera body. In such an alternative embodiment, a blurring correction unit could be provided in the lens unit (e.g., to shift a lens group in order to provide blur correction), or in the camera (e.g., to shift the imaging unit to provide blur correction).

Figure 4:
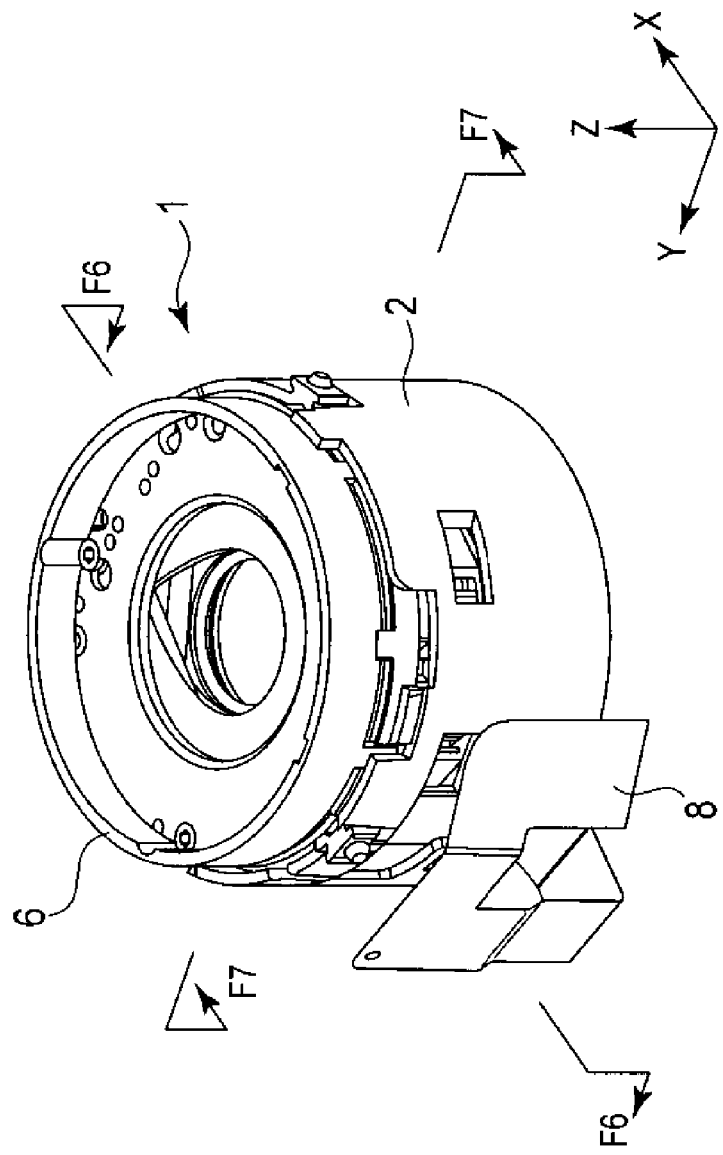
FIG. 4 is a perspective view showing a blur correction unit according to the embodiment incorporated in the lens unit of FIG. 2.
Figure 5:
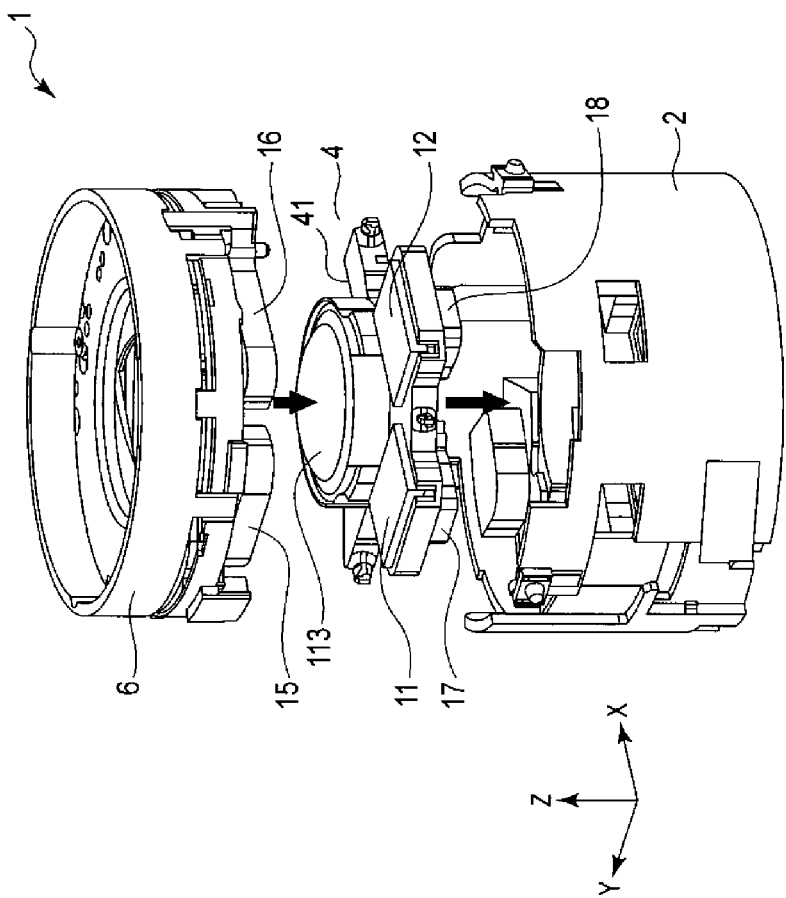
FIG. 5 is an exploded perspective view of the blur correction unit of FIG. 4.

FIG. 4 is a perspective view showing a blur correction unit 1 incorporated in the lens unit 100 of FIG. 2. FIG. 5 is an exploded perspective view of the blur correction unit 1 of FIG. 4. The blur correction unit 1 includes the above-described third lens group 113, and image blur can be corrected by moving the third lens group 113 along an 'XY' plane perpendicular to the optical axis O.

Figure 6:
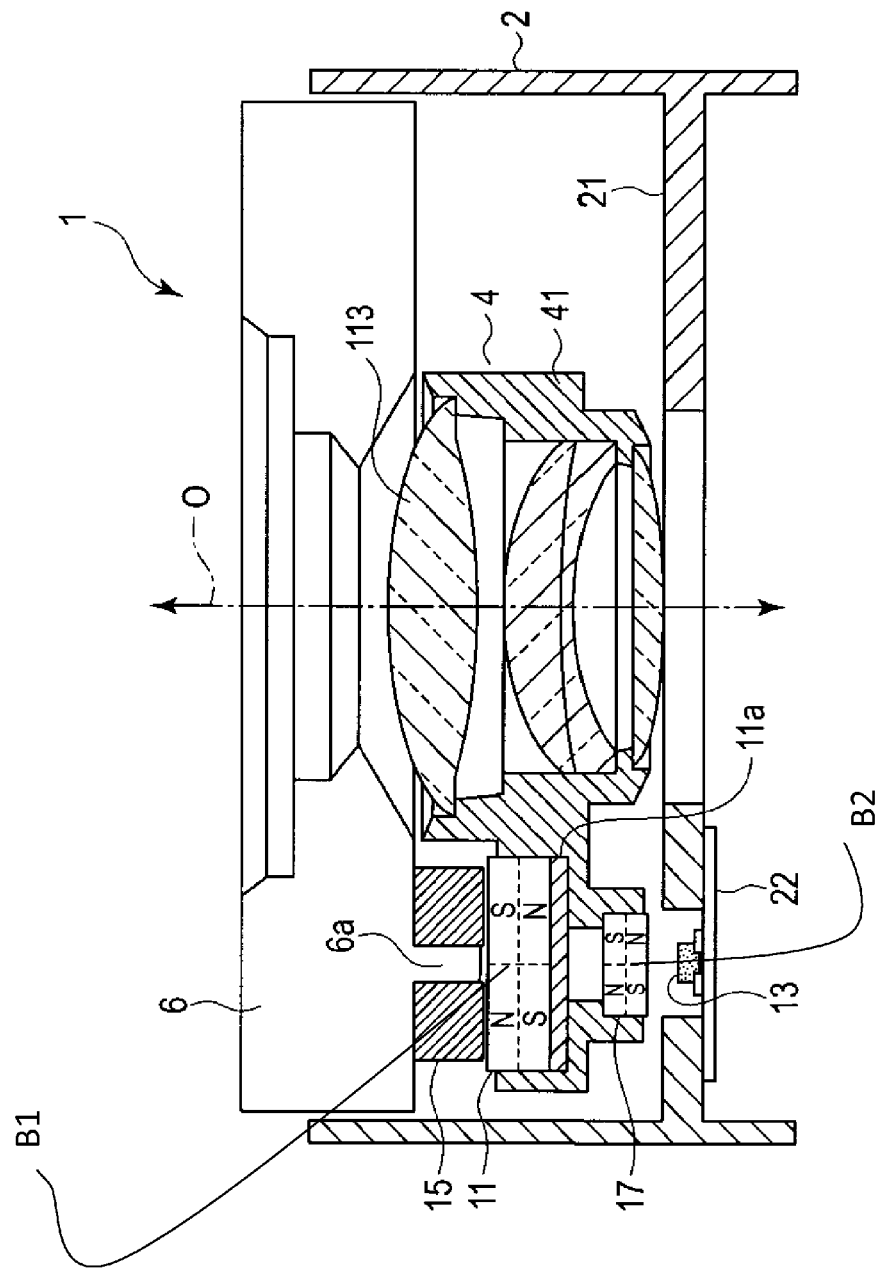
FIG. 6 is a sectional view obtained by cutting the blur correction unit of FIG. 4 along line F6-F6.

As shown in FIG. 5, the blur correction unit 1 includes a fixed barrel 2, a movable body 4 which holds the third lens group 113 (optical member) and a shutter unit 6. The third lens group 113 is fixed to the movable body 4 such that its movement corresponds to that of the moveable body. More specifically, as shown in FIG. 6, the third lens group 113 is fixed to a frame 41 of the movable body 4. The shutter unit 6 functions as a first fixing member. The fixed barrel 2 functions as a second fixing member. The movable body 4 functions as a movable member. That is, the fixed barrel 2 is fixed to the first lens barrel 101 of the lens unit 100 and the shutter unit 6 is fixed to in front of the fixed barrel 2.

Two hall elements 13 and 14 are fixedly attached to a frame 21 of the fixed barrel 2. (See FIGS. 6 and 7.) The hall element 13 is a detection means which detects movement of the movable body 4 in the X axis direction. The hall element 14 is a detection means which detects movement of the movable body 4 in the Y axis direction. Two coils 15 and 16 are fixedly provided on the shutter unit 6, opposite to the hall elements 13 and 14, respectively, in the optical axis direction. In an assembled state of the blur correction unit 1 shown in FIG. 4, the two hall elements 13 and 14 are disposed far away enough from the coils 15 and 16, respectively, in the optical axis direction so as not to receive any influence of a respective magnetic field from the two coils 15 and 16. More specifically, the magnitude and direction of the current to be supplied to the coils 15 and 16 is changed frequently in order to move the movable body 4 frequently to eliminate or reduce blur. As a result, the magnitude of a generated magnetic field also changes frequently. The two hall elements 13 and 14 are used to detect the magnetic fields of the respective second magnets 17 and 18, whose positions change. If a distance between the coils 15 and 16 and the hall elements 13 and 14, respectively, is short at this time, the magnetic field (which changes frequently) leaks, and is detected by the hall elements 13 and 14. That is, the influence of the magnetic fields for the coils 15 and 16 on the respective hall elements 13 and 14 can become large if the spacing is too small. Accordingly, the hall elements 13 and 14 are disposed far away enough from the coils 15 and 16, respectively, in the optical axis direction. Although there is slight influence of the first magnets 11 and 12 and the second magnets 17 and 18, this is not a problem because the first magnets 11 and 12 are disposed far away enough from the coils 15 and 16 so as not to generate an influence on the hall elements. (See FIGS. 13 and 14), and the magnetic forces of the second magnets 17 and 18 are weak.

Figure 7:
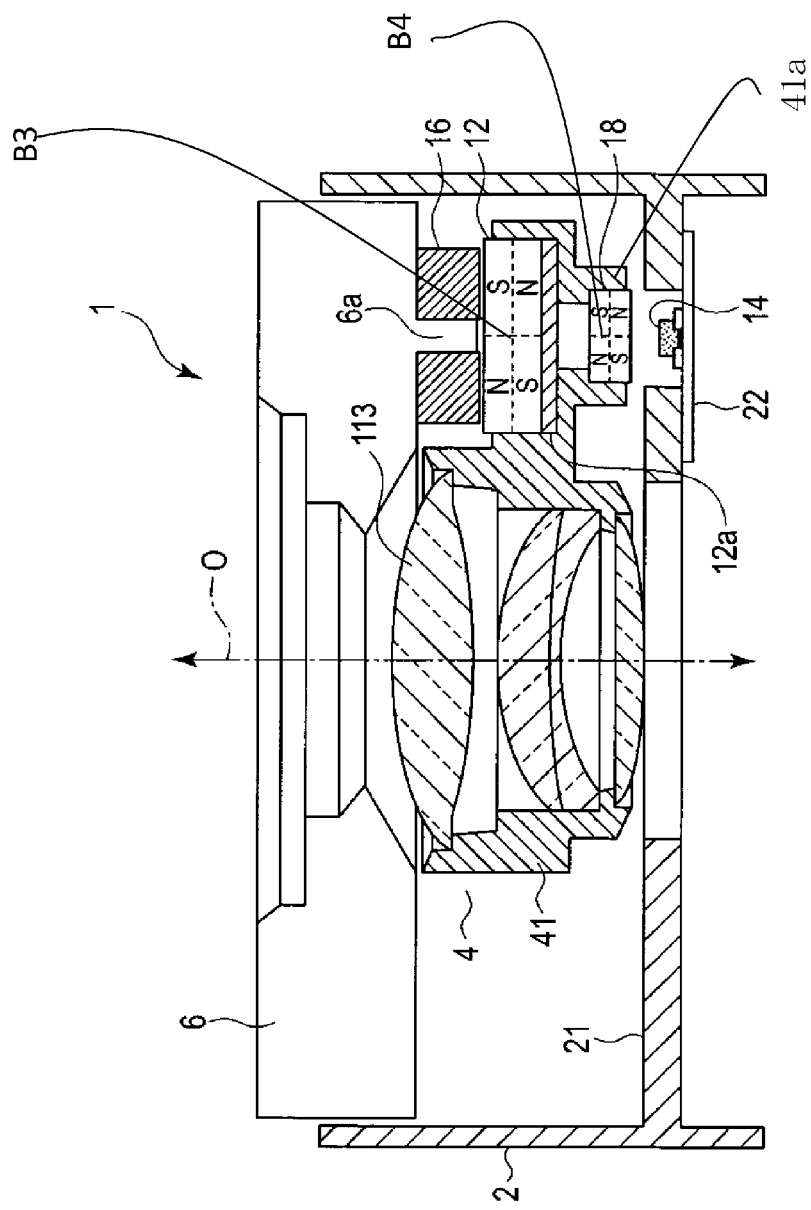
FIG. 7 is a sectional view obtained by cutting the blur correction unit of FIG. 4 along line F7-F7.

FIG. 6 is a sectional view obtained by cutting the blur correction unit 1 of FIG. 4 along an 'XZ' plane which passes though the optical axis O. FIG. 7 is a sectional view obtained by cutting the blur correction unit 1 of FIG. 4 along a 'YZ' plane which passes though the optical axis O. Referring to FIG. 6, a magnet 11 for driving (hereinafter referred to as 'first magnet 11') and a magnet 17 for position detection (hereinafter referred to as 'second magnet 17') are disposed between the coil 15 and the hall element 13, but do not contact each other (in a non-contact state). Similarly, referring to FIG. 7, a magnet 12 for driving (hereinafter referred to as 'first magnet 12') and a magnet 18 for position detection (hereinafter referred to as 'second magnet 18') are disposed between the coil 16 and the hall element 14, but do not contact each other (in a non-contact state). The first magnets 11 and 12 are attached to a frame 41 of the movable body 4 on a side closer to the object being photographed, and the second magnets 17 and 18 are attached to the frame 41 of the movable body 4 on a side closer to the image sensor 120. According to the example embodiment illustrated, the first magnets 11 and 12 and second magnets 17 and 18 are disposed such that there is space between them. (See FIGS. 6 and 7.)

The drive mechanism for moving the movable body 4 in the X axis direction (FIG. 6) has basically the same configuration as that for moving the movable body 4 in the Y axis direction (FIG. 7). Therefore, only one of the drive mechanisms will be described in the following. (More specifically, the mechanism shown in FIG. 6 for movement in the X axis direction will be described and that of FIG. 7 will be omitted.)

The coil 15 is fixedly provided on the shutter unit 6 on a side facing the image sensor 120. The shutter unit 6 includes a positioning boss 6a for positioning the coil 15, and the coil 15 is attached thereto. Thus, the positioning boss 6a positions the coil 15 on the 'XY' plane.

The hall element 13 is disposed at a remote position from the coil 15 in the optical axis direction. The hall element 13 is mounted on a substrate 22 and attached to the frame 21 of the fixed barrel 2. The substrate 22 is disposed on a side of the frame 21 facing the image sensor 120 and touches the frame 21. (As the substrate, a flexible substrate can be used.)

The first magnet 11 (for driving) is fixedly provided in the frame 41 of the movable body 4 near and facing a side of the coil 15 facing the image sensor 120. It is preferable to dispose the coil 15 as close to the first magnet 11 as possible. According to the example embodiment illustrated, the magnet 11 is provided with a yoke 11a between the frame 41 on a side away from the coil 15 (facing the image sensor 120). The yoke 11a is not necessary and need not be included in alternative embodiments.

The second magnet 17 (for position detection) is fixedly provided in the frame 41 of the movable body 4, apart from the first magnet 11 (and yoke 11a) and facing the object-facing side of the hall element 13. The second magnet 17 applies a magnetic field that can be sensed by the hall element 13. Consequently, the hall element 13 can detect a position of the movable body 4 along the X axis based on a detected strength or a change in detected strength of the magnetic field. Further, the second magnet 17 is magnetically coupled to the first magnet 11 and assists the second magnet 17 in driving the movable body 4 along the X axis direction. Therefore the position of the second magnet 17 along the optical axis direction is chosen so as to satisfy both position detection (in cooperation with the hall element 13) and drive of the movable body 4 (in cooperation with the first magnet 11). The second magnet 17 is arranged such that the magnetic force of the second magnet 17 complements (that is, enhances) the magnetic force of the first magnet 11. That is, the second magnet 17 is magnetically coupled with the first magnet 11. Consequently, the magnetic force of the second magnet 17 enhances the magnetic force of the first magnet 11.

As described above, the coil 15, the first magnet 11, the second magnet 17, and the hall element 13 are sequentially disposed in the optical axis direction (Z axis direction) so that the hall element 13 may be disposed closest to the image sensor 120. The coil 15, the first magnet 11, the second magnet 17, and the hall element 13 do not touch each other and are spaced apart from each other. The four components are disposed such that a center of each component is on a line (not shown) parallel to the optical axis O.

Figure 8:
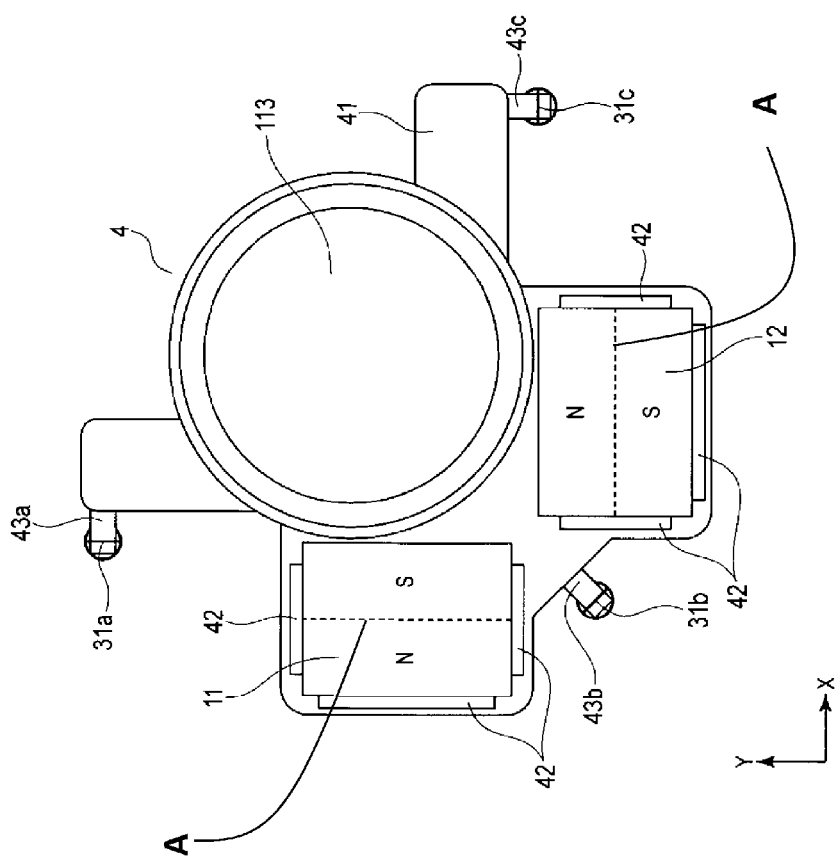
FIG. 8 is an illustration showing a movable body of FIG. 5 from an object side.

As seen from FIGS. 6 to 8, each of the first magnets 11 and 12 and the second magnets 17 and 18 consists of two magnets which were adhered in the optical axis direction. Each magnet (first magnet 11, 12 and second magnet 17, 18) has a virtual boundary line A (See, e.g., dotted lines of FIG. 8) and virtual boundary line B (See, e.g., dotted lines of FIGS. 6 and 7.). The virtual boundary line A and the virtual boundary line $B_1$ of magnet 11 are explained with reference to FIGS. 6 and 8. In FIG. 8, the virtual boundary line A of the magnet 11 is located virtually between an N pole and an S pole, and is oriented in a direction (Y-direction) that is perpendicular to an optical axis. Referring to FIG. 6, the virtual boundary line $B_1$ of the magnet 11 is oriented in a direction (Z-direction) parallel to the optical axis. Thus, the virtual boundary lines A and $B_1$ define a YZ plane that is parallel to an optical axis. As previously described with reference to FIG. 6, two magnets are adhesively bonded so that the magnetic poles are reversed. That is, virtual line $B_1$ defines a boundary line between (1) an N pole and an S pole of the upper part of magnet 11, and (2) an S pole and the N pole of the lower part of the magnet 11. Referring now to FIG. 7, note that the magnet 12 is arranged in an orientation rotated 90 degrees from magnet 11. Notice that the magnet 12 also has a virtual boundary line A as shown in FIG. 8, and a virtual boundary line $B_3$ as shown in FIG. 7. Together, these virtual boundary lines A and $B_3$ define an XZ plane that is parallel to an optical axis. Referring to both FIGS. 6 and 7 although the magnet 17 is different from the magnet 11 in size and magnetic force, and the magnet 12 is different from the magnet 18 in size and magnetic force, the magnets 17 and 18 have (1) virtual boundary lines A (not shown) corresponding to those A of magnets 11 and 12, respectively, and (2) virtual boundary lines $B_2$ and $B_4$ corresponding to $B_1$ and $B_3$, respectively. Thus, the virtual boundary line A of the first magnet 11 and the virtual boundary line A (not shown) of the second magnet line 17 are located in parallelism in an optical axis direction (Z-axis direction) and are placed in the same YZ plane. Similarly, the virtual boundary line A of the first magnet 12 and the virtual boundary line A (not shown) of the second magnet line 18 are located in parallelism in an optical axis direction (Z-axis direction) and are placed in the same XZ plane. Further, as shown in FIG. 6, virtual boundary lines $B_1$ and $B_2$ of the magnets 11 and 17, respectively, are located on the same line (or at least are parallel on a YZ plane) in an optical axis direction (Z-axis direction). Likewise, as shown in FIG. 7, virtual boundary lines $B_3$ and $B_4$ of the magnets 12 and 18, respectively, are located on the same line (or at least are parallel on an XZ plane) in an optical axis direction (Z-axis direction). Finally, $B_1$ and $B_2$ and $B_3$ and $B_4$ are parallel with each other in an optical axis direction.

Figure 9:
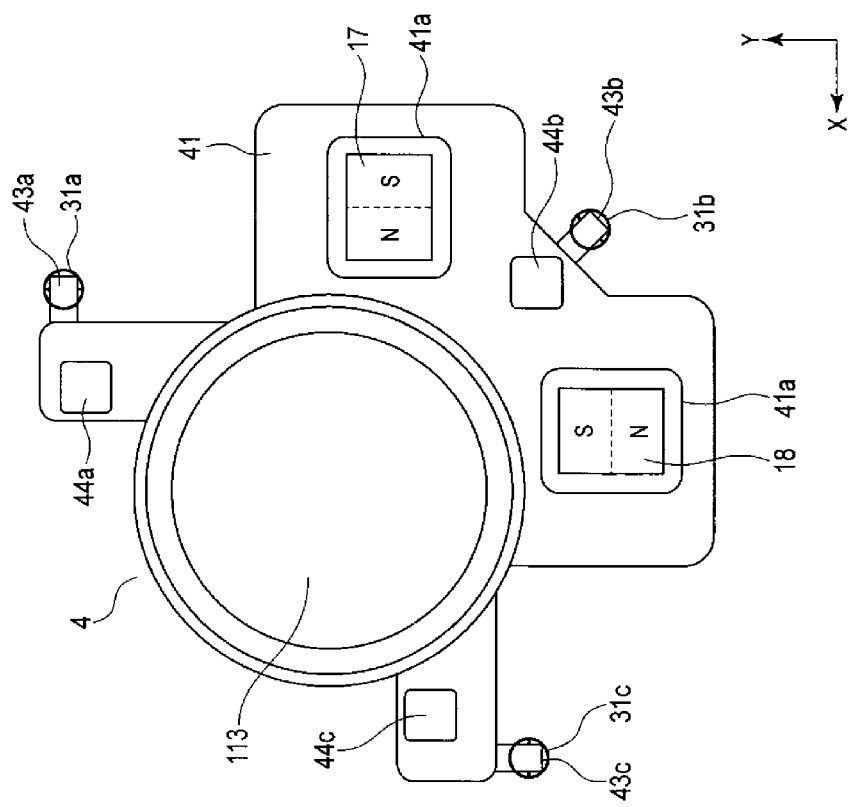
FIG. 9 is an illustration showing the movable body of FIG. 8 from an image sensor.
Figure 10:
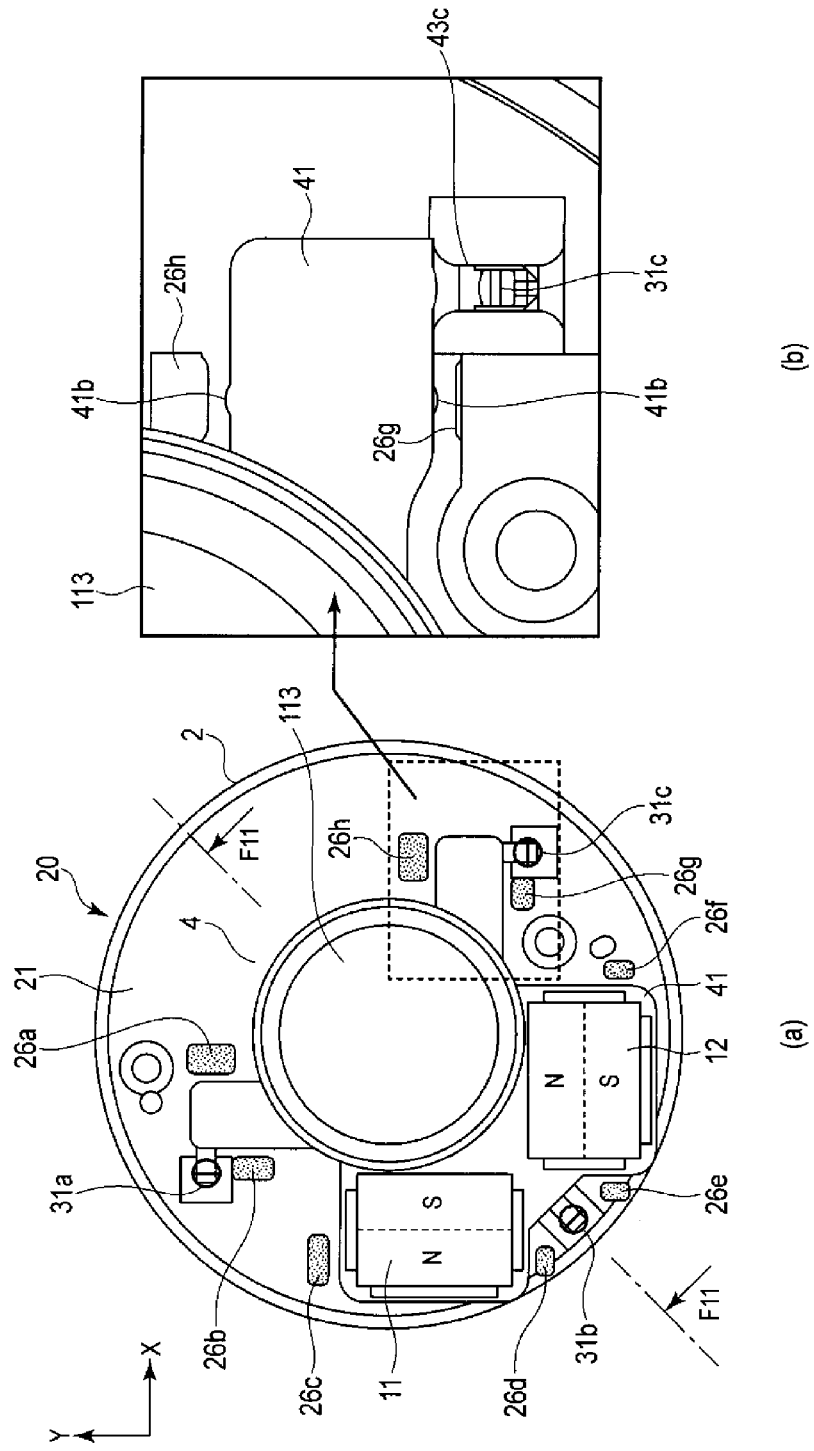
FIG. 10 (b) is a partial magnified view of a principal part of FIG. 10 (a).
Figure 11:
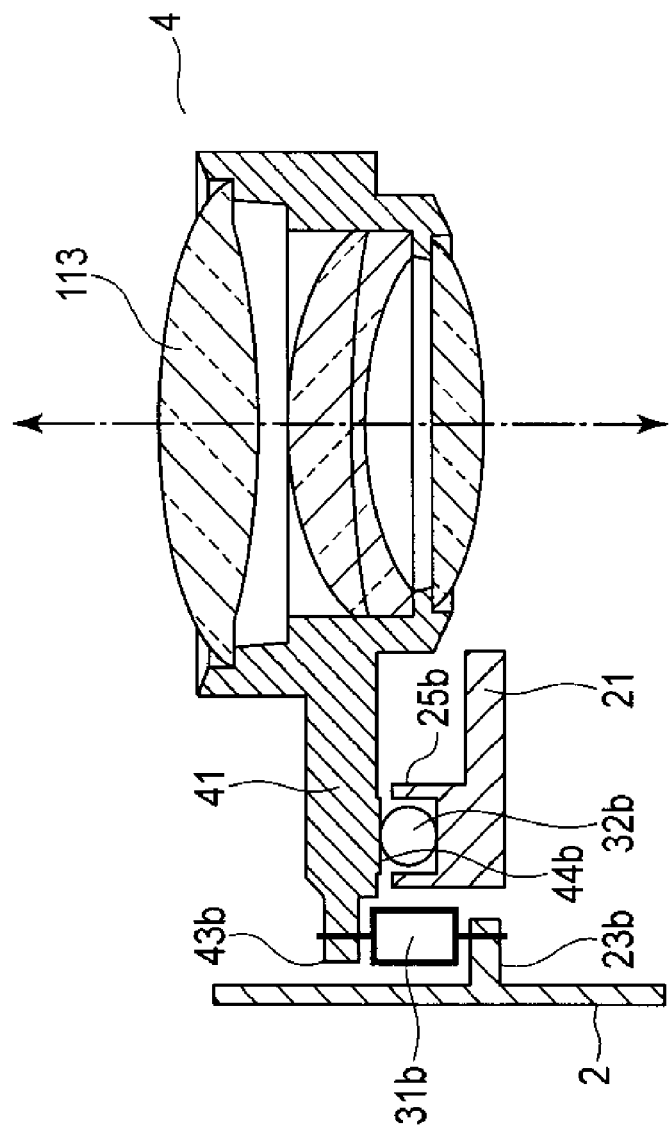
FIG. 11 is a sectional view obtained by cutting the assembly of FIG. 10(a) along line F11-F11.

A structure for holding the movable body 4 in a movable condition along the 'XY' plane will be described below with reference to FIGS. 8 to 11. FIG. 8 is an illustration showing the movable body 4 from the object side. FIG. 9 is an illustration showing the movable body 4 from the image sensor 120. FIG. 10(a) is an illustration showing an assembly 20 from the object side wherein the movable body 4 is attached to the fixed barrel 2. FIG. 10 (b) is a partial magnified view of a principal part of the assembly 20 of FIG. 10 (a). FIG. 11 is a sectional view obtained by cutting the assembly 20 of FIG. 10(a) along line F11-F11.

As shown in FIG. 11, a spring 31b is provided, which connects the frame 21 of the fixed barrel 2 to the frame 41 of the movable body 4 via a ball 32b. One end of the spring 31b is connected to the frame 41 of the movable body 4, and another end of the spring 31b is connected to hook 23b at a side of the spring 31b facing the image sensor 120 (not shown, on a lower side in the drawing). In FIG. 11, the spring 31b is shown representatively, but actually three springs 31a, 31b and 31c and three hooks 23a, 23b and 23c to which the springs are connected are provided on the frame 21 of the fixed barrel 2. Similarly three balls 32a, 32b and 32c are provided between the frame 21 of the fixed frame 2 and frame 41 of the movable body 4, and three depressions 25a, 25b and 25c for receiving the three balls 32a, 32b and 32c, respectively, are provided. (In FIG. 11, only the depression 25b is shown.)

As shown in FIGS. 10 (a) and (b), eight stoppers 26a, 26b, 26c, 26d, 26e, 26f, 26g and 26h are provided, and project from the frame 21 of the fixed barrel 2 on a side facing the object. The eight stoppers 26a to 26h can come into contact with an edge of the frame 41 of the movable body 4 thereby limiting its movement and defining a movable range of the movable body 4 along the 'XY' plane.

The movable body 4 includes the frame 41 and the third lens group 113 is attached at a center thereof. As shown in FIG. 8, the two first magnets 11 and 12 are provided in the frame 41 on a side facing the object. Referring back to FIGS. 6 and 7, these two first magnets 11 and 12 respectively face the coils 15 and 16 provided in the shutter unit 6. As shown in FIG. 9, the two second magnets 17 and 18 are provided in the frame 41 on a side facing the image sensor 120. Referring back to FIGS. 6 and 8, these two second magnets 17 and 18 respectively face the two hall elements 13 and 14 fixedly attached to the frame 21 of the fixed barrel 2. The second magnets 17 and 18 are smaller and weaker than the first magnets 11 and 12.

As shown in FIGS. 6 and 7, each of the first magnets 11 and 12 is arranged in a respective depression of the frame 41, on a closer facing the object. Referring to FIG. 8, each of the first magnets 11 and 12 is fixed within the respective depression by an adhesive agent 42 provided at three peripheral sides. Referring to FIGS. 7 and 9, each of the second magnets 17 and 18 is fixed (e.g., by an adhesive agent) to an end of a respective projecting portion 41a projecting towards the image sensor 120. The movable body 4 is basically arranged such that the optical axis O of the lens unit 100 passes through the center of the third lens group 113.

Additionally, the frame 41 is provided with three hooks 43a, 43b and 43c for attaching an end of the respective above-described springs 31a, 31b and 31c, and three pads 44a, 44b and 44c for contacting the surfaces of the respective three balls 32a, 32b and 32c in the above-described respective three depressions 25a, 25b and 25c. As shown in FIG. 9, the three pads 44a, 44b and 44c are provided on the frame 41 on a side facing the image sensor 120.

That is, the three hooks 43a, 43b and 43c are provided opposite to the three hooks 23a, 23b and 23c. respectively, of the fixed barrel 2 in the optical axis direction, and the three pads 44a, 44b and 44c are provided opposite to the three depressions 25a, 25b and 25c, respectively, of the fixed barrel 2 in the optical axis direction.

As shown in FIG. 10 (a), the movable body 4 is arranged inside the fixed barrel 2, and a peripheral edge portion of the frame 41 of the movable body 4 is arranged inside the fixed barrel 2, apart from the eight stoppers 26a, 26b, 26c, 26d, 26e, 26f, 26g and 26h projecting from the frame 21 of the fixed barrel 2. The eight stoppers include the four stoppers 26a, 26b, 26e and 26f for limiting the movement of the movable body 4 along the X axis (to left/right in FIG. 10(a)) and four stoppers 26c, 26d, 26g and 26h for limiting the movement of the movable body 4 along the Y axis (to the vertical direction in FIG. 10(a)). The eight stoppers limit movement of the movable body 4 within the XY plane, thereby defining the movable range of the movable body 4 within the 'XY' plane.

More specifically, as a structure around the two stoppers 26g and 26h is representatively shown in FIG. 10 (b), the frame 41 of the movable body 4 is provided with small protrusions 41b which project towards each facing stopper at the periphery. There is slight space between the protrusion 41b of the frame 4 and facing stopper 26g (or 26h). With space between the peripheral edge portion and each stopper (26a to 26h), the movable body 4 can move along the 'XY' plane along the Y axis.

As shown in FIG. 11, representative spring 31b is arranged between, and attached to, the hook 43b provided in the frame 41 of the movable body 4 and the hook 23b provided in the frame 21 of the fixed barrel 2. In FIG. 11, the spring 31b is in a slightly stretched state. The ball 32b is arranged inside the depression 25b provided in the frame 21 of the fixed barrel 2. A surface of the ball 32b contacts the pad 44b provided on the frame 41 of the movable body 4. That is, the ball 32b is sandwiched between the depression 25b and pad 44b, and due to resilience of the spring 31b, the ball 32b is pressed from both sides.

Although not shown, similarly the ball 32a is arranged inside the depression 25a provided in the frame of the fixed barrel 2 and the spring 31a is arranged between, and attached to, the hook 43a provided in the frame 41 of the movable body 4 and the hook 23a provided in the frame 21 of the fixed barrel 2. Additionally, the ball 32c is arranged inside the depression 25c provided in the frame of the fixed barrel 2 and the spring 31c is arranged between, and attached to, the hook 43c provided in the frame 41 of the movable body 4 and the hook 23c provided in the frame 21 of the fixed barrel 2.

The fixed barrel 2 and movable body 4 do not contact each other, though they are indirectly connected via the three springs 31a, 31b and 31c and three balls 32a, 32b and 32c. Therefore the movable body 4 is supported in a floating manner by the frame 21 of the fixed barrel 2. That is, the movable body 4 can move relative to the fixed barrel 2 along the 'XY' plane.

Referring back to FIGS. 6 and 7, a slight space is provided between the hall elements 13 and 14 attached to the frame 21 of the fixed barrel 2 and the second magnets 17 and 18, respectively. Similarly, a slight space is provided between the coils 15 and 16 attached to the shutter unit 6 and the first magnets 11 and 12, respectively. As a result, the movable body 4 can move without these components contacting each other. That is, by passing electrical currents through the coils 15 and 16 for driving, a magnetic field is generated by each coil depending on a direction and magnitude of the respective current. Consequently, the movable body 4 can move along the 'XY' plane.

Figure 12:
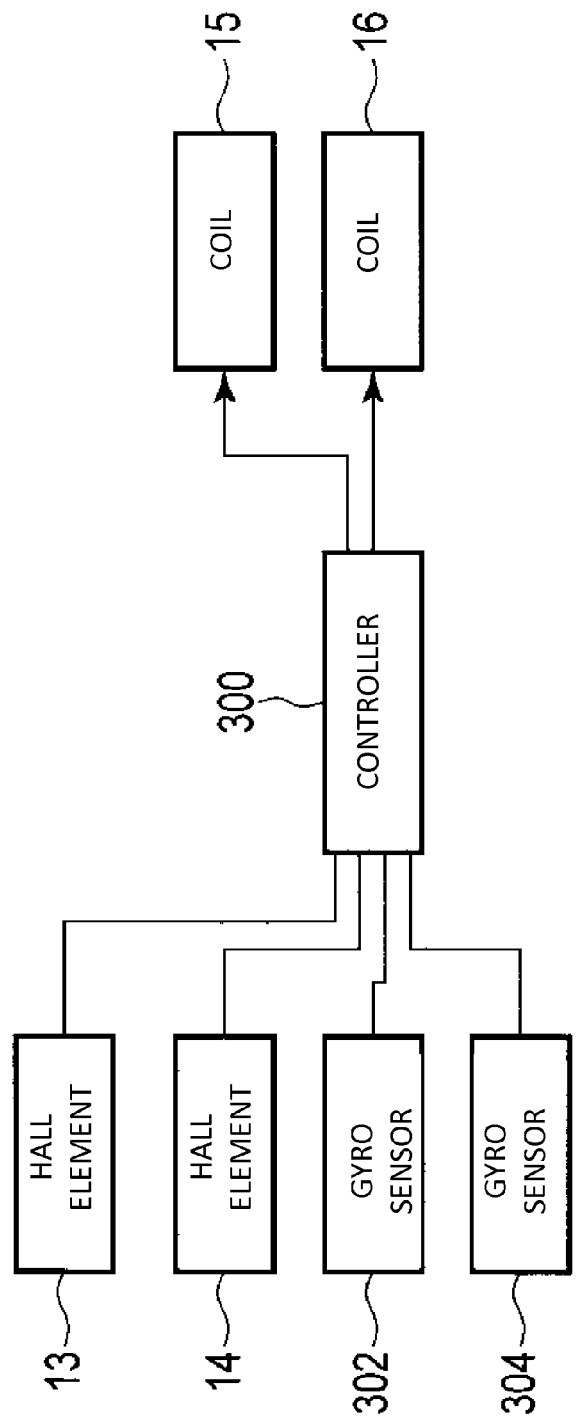
FIG. 12 is a block diagram showing a control system which controls the blur correction unit of FIG. 4.

FIG. 12 is a block diagram showing a control system which controls the movement of the above-described blur correction unit 1. Outputs of the two hall elements 13 and 14, which collectively detect the position of the movable body 4 along the 'XY' plane, provides signals to a controller 300 (control unit) which controls an operation of the blur correction unit 1. More specifically, the hall element 13 shown in FIG. 6 detects a magnetic field indicative of the position of the movable body 4 along the X axis direction, and outputs a corresponding signal, and the hall element 14 shown in FIG. 7 detects a magnetic field indicative of the position of the movable body 4 along the Y axis direction, and outputs a corresponding signal.

Further, two gyro sensors 302 and 304 (detecting unit) which detect blur of the digital camera 10 due to shaking, provide signals to the controller 300. When the optical axis of the digital camera 10 is shaken along the 'XZ' plane and blur occurs in a yaw direction, the gyro sensor 302 detects acceleration in the yaw direction, and outputs a corresponding signal. When the optical axis of the digital camera 10 is shaken along the 'YZ' plane and blur occurs in a pitch direction, the gyro sensor 304 detects acceleration in the pitch direction, and outputs a corresponding signal.

Further, the above-descried coils 15 and 16, which generate magnetic fields to drive the movable body 4, are connected to the controller 300. The controller 300 controls an amount and direction of currents flowing to the coils 15 and 16 based on respective output signals from the two hall elements 13 and 14 and the two gyro sensors 302 and 304 so that blur of the digital camera 10 can be corrected. The blur correction unit 1 which includes the structure of the control system is one of the example embodiments of the blur correction apparatus according to the present invention.

A blur correction operation by the blur correction apparatus of the above-described structure will be described below. The controller 300 sets the amount and direction of currents flowing to the coils 15 and 16 so as to position the optical axes O of the third lens group 113 and the lens unit 100 in a coaxial configuration by supplying electric current to the two coils 15 and 16 simultaneously with start of control. Accordingly, the movable body 4 can remain in a neutral position (that is, a position in which the optical axes O of the third lens group 113 is coaxial with that of the lens unit 100).

When photographing starts, for example, in this state, the controller 300 detects the amount of blur based on the output from the two gyro sensors 302 and 304 and detects position information of the movable body 4 based on the output from the two hall elements 13 and 14. Then a correction amount is calculated based on the detection results. Based on the calculated correction amount, the controller 300 controls the amount and direction of currents flowing to the coils 15 and 16 to move movable frame 4 holding the third lens group 113 such that blur is corrected.

Effects of the above-described embodiment will be described below by focusing on the drive mechanism for driving the movable body 4 in the X axis direction (FIG. 6). If an electrical current is passed through a coil, a magnetic flux is generated depending on an amount of current and number of turns of the coil. As described above, if the distance between the hall element 13 and the coil 15 is shorter than the predetermined amount, or if the hall element 13 is set at a position where the hall element 13 is influenced by the coil 15, magnetic flux of the coil 15 becomes leakage magnetic flux, and as a result, the hall element 13 detects the leakage magnetic flux as a noise.

On the other hand, according to the example embodiment of FIG. 6, the first magnet 11 for driving and the second magnet 17 for position detection are arranged so as to overlap with each other along the Z axis which is parallel to the optical axis O, and perpendicular to a driving direction of the movable body 4. Accordingly, a large enough magnetic flux necessary for driving can be applied to the coil 15. Further, the magnetic flux detected by the hall element due to the position of the second magnet 17 is large enough compared to noises caused by the magnetic flux created by the coil 15. Consequently, a driving force and acceleration relative to the movable body 4 can be increased. This increase improves the efficacy of blur correction. Further, an S/N (signal-to-noise) ratio of position detection of the movable body 4 can be increased. Accordingly, accuracy of position control can be significantly improved.

Especially, according to the example embodiment, the second magnet 17 for position detection both (1) operates in collaboration with the hall element 13 to detect the position of the movable body 4 along the X axis, and (2) is magnetically coupled to the magnet 11 which improves driving of the movable body 4 drive along the X axis. Accordingly, the driving force can be increased compared to a case in which the second magnet is not provided. When the second magnet is provided, it is preferable to arrange the first and second magnets close to each other in order to increase acceleration.

However, when the second magnet 17 is located too close to the first magnet 11, the accuracy of position detection is decreased. More specifically, in such a state, when the movable member 4 is driven so as to be moved largely, the hall element 13 can detect the magnetic force of the second magnet 17 because the magnetic force of the second magnet 17 is very small and the output is small, but a range of the output value becomes large. However, in the case where the movable member 4 is driven so as to be moved in such a way as to oscillate, the output value of hall element 13 does not change. Accordingly the hall element 13 cannot detect magnetic force change of the second magnet 17 in such a case. That is, it is necessary to adjust the position of the second magnet 17 along the optical axis direction properly so as to both (1) assist the movable body 4 drive and (2) accurately detect the position of the movable body 4 with the hall element 13.

For an example, consider a case in which the second magnet 17 is not provided. The first magnet 11 needs to be located close to the coil 15 in order to generate an enough driving force for driving the movable body 4. Additionally, the first magnet 11 needs to be located close to the hall element 13 in order to apply an enough magnetic field for the hall element 13 to be able to detect position. Further, the hall element 13 needs to be located away from the coil 15; otherwise accuracy of position detection be decreased due to effects of the magnetic field generated from the coil 15 (i.e., due to noise). That is, if the second magnet 17 is not provided, it is necessary to increase thickness of the first magnet 11 in the optical axis direction in order to satisfy the above-described conditions. In this case, a size of the first magnet 11 will become large and the movable body 4 will become heavy. This increased weight increases inertia and consequently, enough acceleration cannot be obtained for drive-controlling the movable body 4.

To solve the above-described problems, according to the example embodiment, the second magnet 17 for position detection is provided between the first magnet 11 and the hall element 13. A proper location of the second magnet 17 along the optical axis direction will be described below with reference to FIGS. 13 and 14.

Figure 13:
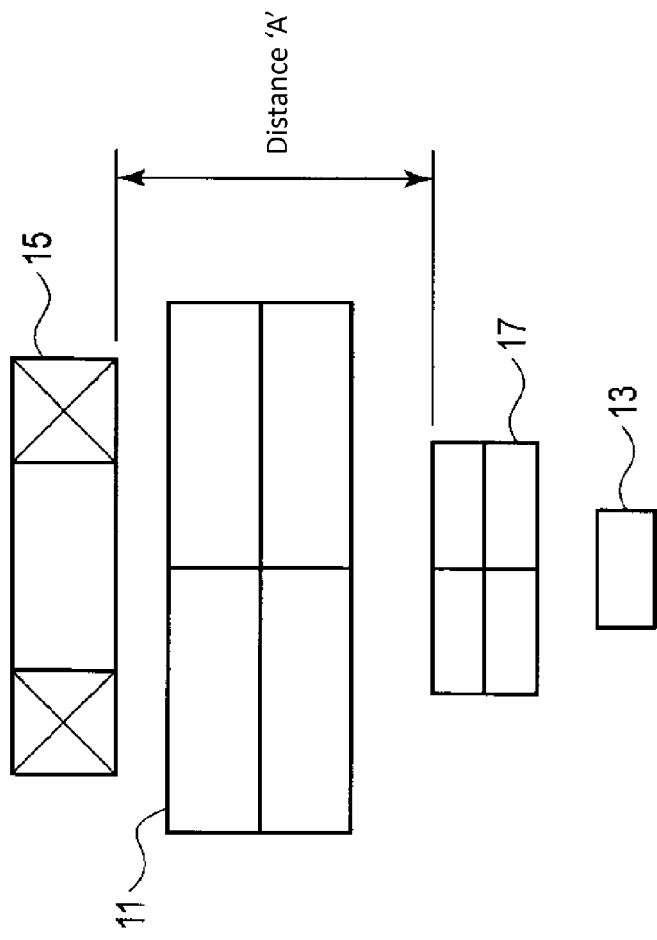
FIG. 13 is a layout indicating a relationship of components incorporated in the blur correction unit of FIG. 4 along the optical axis.
Figure 14:
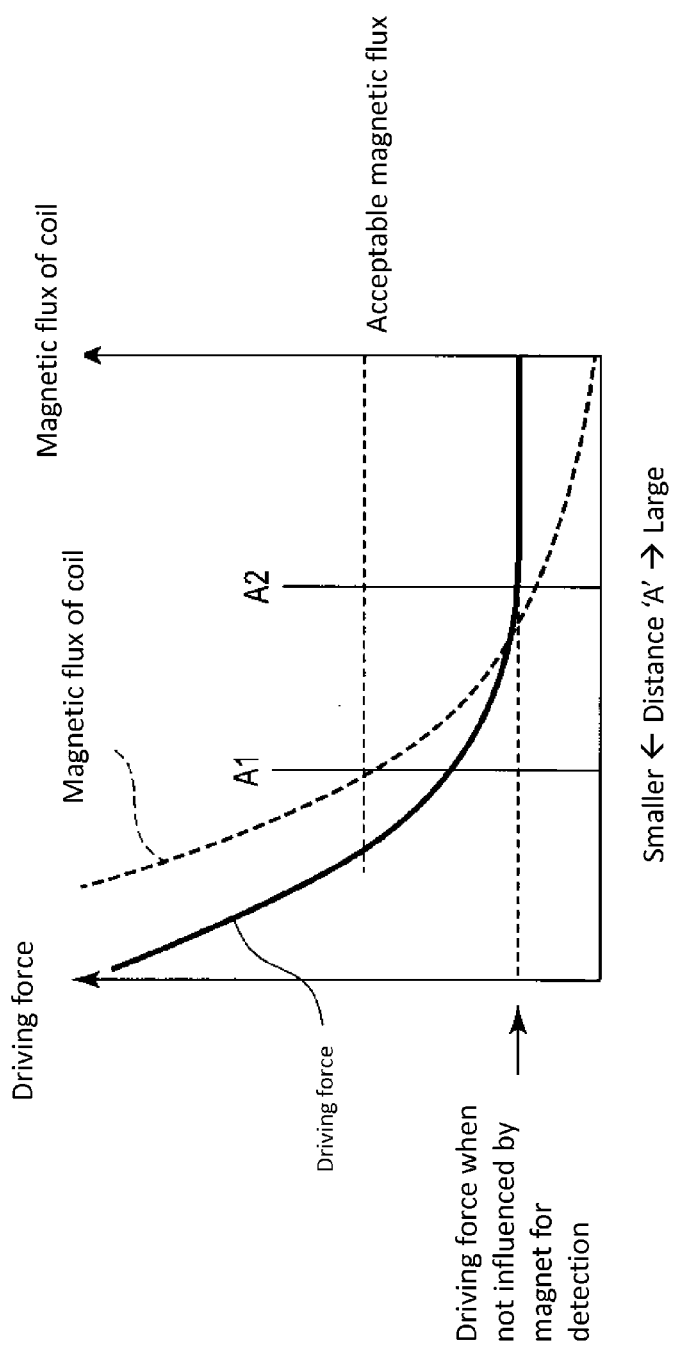
FIG. 14 is a graph showing a driving force and magnitude of the magnetic flux when a distance 'A' of FIG. 13 is changed.

FIG. 13 schematically shows a positional relationship along the optical axis direction between the coil 15, first magnet 11, second magnet 17 and hall element 13. FIG. 14 shows a relationship between the driving force applied to the movable body 4 and the magnitude of the magnetic flux generated at the coil and detected by the hall element 13 in changing a distance 'A'. The distance A is a distance between a lower surface of the coil 15 (a side facing the image sensor 120 (not shown) provided underside of the drawing) and an upper side of the second coil 17 (a side facing the object and opposite to the image sensor 120 (not shown)) when distances between the coil 15 and the first magnet 11 and between the hall element 13 and second coil 17 are constant.

Variations of the driving force will be described first. As shown in FIG. 14, the driving force is the largest when the distance 'A' is the smallest (that is, when the second magnet 17 touches the first magnet 11). If the distance between the second magnet 17 and the first magnet 11 is gradually decreased, the driving force is reduced, as indicated by the gentle curve. When the distance 'A' value reaches 'A2' (where the magnetic force from the second magnet 17 does not apply to the coil 15), the driving force is generated by only the first magnet 11 and remains constant. At the position where the distance between the first magnet 11 and the second magnet 17 reaches 'A2', the driving force for driving the moveable member 4 depends on only the magnetic force from first magnet 11. At the position where the distance between the first magnet 11 and the second magnet 17 reaches 'A1', sensitivity (db) is constant. In the present embodiment, as shown in FIG. 16, the (db) remains at about '−60' when frequency is more than 1 kHz. It is noted that the value is not necessary '−60'. As seen from FIG. 15, sensitivity should be low enough not to be '0' even if a gain is increased greatly.

Variations of the magnetic flux which is generated by the coil 15 and passes through the hall element 13 will now be described. The magnetic flux of the coil 15, which is noise not relevant to the position detection by the hall element 13, gradually decreases as the distance 'A' increases. For highly accurate position detection, a smaller magnetic flux (noise) of the coil 15 which passes through the hall element 13 may be acceptable if it does not exert an undue influence on position detection. It is preferable that the distance 'A' be no less than 'A1' such that the magnetic flux (noise) is at or below an acceptable level. As should be appreciated from the foregoing, setting the distance 'A' between the distance 'A2' which the second magnet 17 can be effective on for a driving force of a VCM and the distance 'A1' where accuracy of position detection by the hall element 13 is not unduly affected enables the driving force of a VCM to be increased and without adversely affecting the accuracy of position detection.

Figure 15:
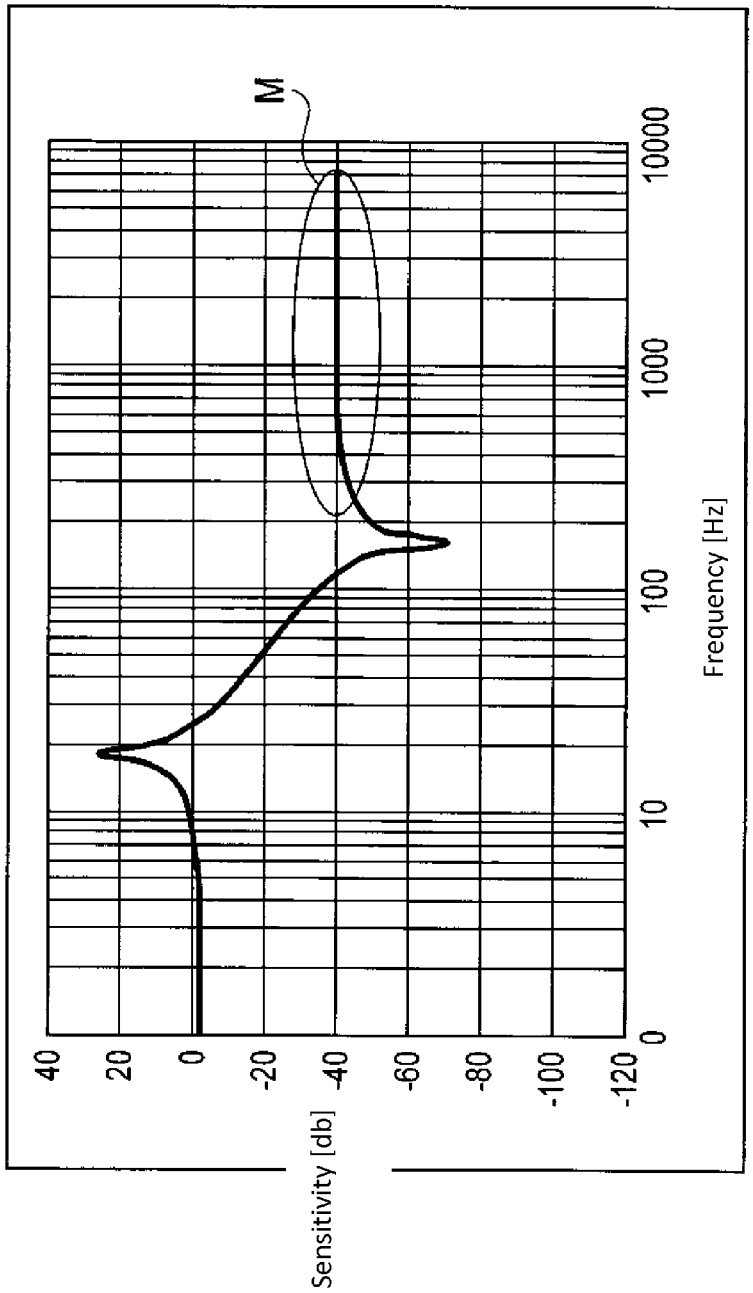
FIG. 15 is a graph showing driving frequency characteristics of hall element output of the blur correction unit which does not include a second magnet.
Figure 16:
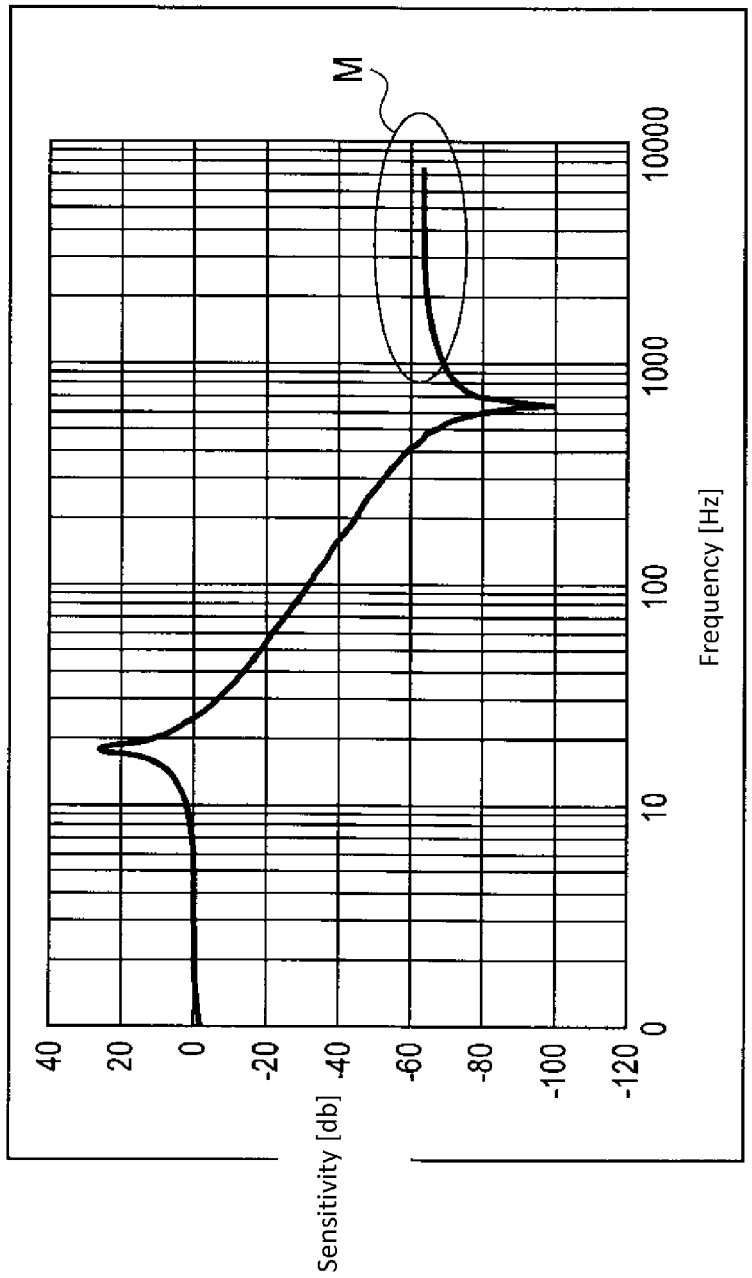
FIG. 16 is a graph showing driving frequency characteristics of hall element output of the blur correction unit according to the embodiment which includes a second magnet.

FIG. 15 is a graph showing driving frequency characteristics of hall element output of an example blur correction unit which does not include the second magnet 17. FIG. 16 is a graph showing driving frequency characteristics of hall element output of the blur correction unit according to the example embodiment which includes the magnet 17.

As shown in the graphs, increase in sensitivity 'M' due to that the magnetic flux generated by the coil 15 has been detected by the hall element 13 is seen, whether the second magnet 17 is provided or not. More specifically, the leakage magnetic flux caused by the coil 15 is undesirable for position detection by the hall element 13. That is, the leakage magnetic flux caused by the coil 15 is noise to the hall element 11. The second magnet 17 is placed at the position where (1) the hall element 13 is not affected by this noise, and (2) it contributes to the driving force. However, according to the embodiment where the second magnet 17 is provided, the increase in sensitivity 'M' is lower than a case where the second magnet 17 is not provided. The larger the increase in sensitivity becomes, the narrower sensitivity frequency bandwidth becomes. As a result, stop accuracy (that is, the accuracy to stop the moveable body 4 at a desired position) is reduced, for example. That is, it is advantageous to provide the second magnet 17 like the embodiment for controlling the VCM, too.

The invention is not limited to the embodiments described above, and various modifications and applications can be carried out within the range without departing from the gist of the invention as a matter of course. In the above-described example embodiment(s), for example, each magnet is disposed so that the virtual boundaries (line A) of magnetic poles of the first magnet 11 (12) for driving and the second magnet 17 (18) for position detection can coincide along the driving direction of the movable body 4. However, the virtual boundaries (line A) of magnetic poles need not always coincide in an optical axis direction.

Also, in the above-described example embodiment(s), the third lens group was described as an example of an optical member as an object to be driven for blur correction, but the present invention is not limited to this. For example, in an alternative example embodiment, the image sensor 120 may be used as an optical member to be driven along the 'XY' plane for blur correction.

Also, in the above-described example embodiment(s), there is space between the first magnets 11 and 12 for driving and the respective second magnets 17 and 18 for position detection. However, in an alternative example embodiment, the first magnet may touch the second magnet, without space between the magnets.

As described above, according to the example embodiment(s), the movable body 4 which holds the lens group 113, the first magnets 11,12 for driving which are provided on the movable body, the fixed barrel 2 which holds the movable body 4 in a movable condition in the direction perpendicular to the optical axis O of the lens group, the coils 15,16 which are provided near and facing a side of the first magnets facing the object, the hall elements 13,14 which are provided facing the first magnets 11,12 and apart a certain distance from the coils 15,16, and the second magnets 17,18 for position detection which are provided facing the hall elements 13,14, between the first magnets 11,12 and the hall elements 13,14 in the movable body 4 are included so that the blur correction apparatus can reduce the noises due to influences of the magnetic flux on the hall elements 13,14 and increase the driving force and acceleration without using a larger magnet, when correcting blur.

The present invention is not limited to the embodiments described above, and various modifications and applications can be carried out within the range without departing from the gist of the invention as a matter of course. Further, the above described embodiments include the inventions at various stages, and various inventions can be extracted by combinations, which will be apparent to those skilled in the art, of a plurality of constituent features disclosed. For example, even if several constituent features are removed from all the constituent features shown in the above described respective example embodiments, a configuration from which the constituent features are removed can be extracted as the invention provided that the resulting embodiment can solve one or more of the problems addressed above. The invention is not limited by a specific example embodiment.

What is claimed is:

1. A blur correction apparatus comprising:
   a) a first fixing member on which a coil for generating a magnetic flux is arranged;
   b) a movable member including
      1) a first magnet facing the coil,
      2) a second magnet arranged adjacent to the first magnet, such that the first magnet is arranged between the second magnet and the coil arranged in the first fixing member, and
      3) an optical element,
      wherein the movable member can move in a direction perpendicular to an optical axis of the optical element relative to the first fixing member; and
   c) a second fixing member including a hall element that is arranged adjacent to the second magnet in the movable member,
      wherein the first magnet and the second magnet are positioned on the moveable member such that they strengthen magnetic forces in each other.

2. The blur correction apparatus according to claim 1 wherein a virtual boundary line separating poles of the first magnet and a virtual boundary line separating poles of the second magnet are located in parallel in the optical axis direction of the optical member.

3. The blur correction apparatus according to claim 1 wherein the first fixing member is a shutter unit, and the second fixing member is a lens barrel.

4. The blur correction apparatus according to claim 1 wherein the optical element is either (A) a lens group of a lens barrel, or (B) an image sensor.

5. A blur correction apparatus comprising:
   a) a first fixing member on which a coil for generating a magnetic flux is arranged;
   b) a movable member including
      1) a first magnet facing the coil,
      2) a second magnet arranged adjacent to the first magnet, such that the first magnet is arranged between the second magnet and the coil arranged in the first fixing member, and
      3) an optical element,
      wherein the movable member can move in a direction perpendicular to an optical axis of the optical element relative to the first fixing member; and
   c) a second fixing member including a hall element that is arranged adjacent to the second magnet in the movable member,
      wherein a magnetic force of the second magnet is weaker than that of the first magnet.

6. The blur correction apparatus according to claim 5 wherein a virtual boundary line separating poles of the first magnet and a virtual boundary line separating poles of the second magnet are located in parallel in the optical axis direction of the optical member.

7. The blur correction apparatus according to claim 6 wherein a center of the hall element and the boundaries of magnetic poles are coplanar in a state in which no current passes through the coil.

8. The blur correction apparatus according to claim 5 wherein the first fixing member is a shutter unit.

9. The blur correction apparatus according to claim 8 wherein the second fixing member is a lens barrel.

10. The blur correction apparatus according to claim 5 wherein the optical element is a lens group of a lens barrel.

11. The blur correction apparatus according to claim 5 wherein the optical element is an image sensor.

12. A blur correction apparatus comprising:
   a) a first fixing member on which a coil for generating a magnetic flux is arranged;
   b) a movable member including
      1) a first magnet facing the coil,
      2) a second magnet arranged adjacent to the first magnet, such that the first magnet is arranged between the second magnet and the coil arranged in the first fixing member, and
      3) an optical element,
      wherein the movable member can move in a direction perpendicular to an optical axis of the optical element relative to the first fixing member; and
   c) a second fixing member including a hall element that is arranged adjacent to the second magnet in the movable member,
      wherein the first magnet and the second magnet are spaced apart at a distance at which (1) the second magnet contributes to a driving force generated due to magnetic flux provided from the coil and (2) accuracy of position detection by the hall element is not affected by the magnetic flux.

13. The blur correction apparatus according to claim 12 wherein a virtual boundary line separating poles of the first magnet and a virtual boundary line separating poles of the second magnet are located in parallel in the optical axis direction of the optical member.

14. The blur correction apparatus according to claim 12 wherein the first fixing member is a shutter unit, and the second fixing member is a lens barrel.

15. The blur correction apparatus according to claim 12 wherein the optical element is either (A) a lens group of a lens barrel, or (B) an image sensor.

16. Apparatus comprising:
   a) a first member including a coil for generating magnetic flux;
   b) a second member including a hall element for detecting magnetic flux;
   c) a third member moveable relative to the first and second members, and including
      1) an optical element,
      2) a first magnet facing the coil, and
      3) a second magnet arranged adjacent to the first magnet, such that the first magnet is arranged between the second magnet and the coil, and such that the second magnet is arranged between the first magnet and the hall element; and
   d) a blur correction controller adapted to
      1) receive a first input indicative of blur due to shaking,
      2) receive a second input indicative of magnetic flux detected by the hall element,
      3) determine a blur correction value based on the first and second inputs received, and
      4) provide an output, based on the determined blur correction value, to induce providing a controlled current through the coil,
      wherein, responsive to current flowing through the coil, the first and second magnets cause the third member to move relative to the first member in a direction perpendicular to an optical axis of the optical element, and
      wherein the second magnet is smaller and weaker than the first magnet.

17. The apparatus of claim 16 wherein the optical element is an image sensor.

18. The apparatus of claim 16 wherein the optical element is a lens group.

19. The apparatus of claim 16 wherein the hall element is spaced away from the coil such that noise due to magnetic flux from the coil detected by the hall element is below a predetermined value.

20. The apparatus of claim 16 wherein each of the first member, second member and third member is part of a retractable lens barrel.

* * * * *